United States Patent
Aggarwal et al.

(10) Patent No.: US 7,149,248 B2
(45) Date of Patent: Dec. 12, 2006

(54) COMMAND PACKET SYSTEM AND METHOD SUPPORTING IMPROVED TRICK MODE PERFORMANCE IN VIDEO DECODING SYSTEMS

(75) Inventors: Gaurav Aggarwal, Bangalore (IN); Arun Gopalakrishna Rao, Bangalore (IN); Marcus Kellerman, Aliso Viejo, CA (US); David Erickson, Estival, SC (US); Jason Demas, Irvine, CA (US); Sandeep Bhatia, Bangalore (IN); Girish Hulmani, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 67 days.

(21) Appl. No.: 10/317,389

(22) Filed: Dec. 11, 2002

(65) Prior Publication Data

US 2003/0118116 A1    Jun. 26, 2003

Related U.S. Application Data

(63) Continuation-in-part of application No. 09/951,693, filed on Sep. 12, 2001.
(60) Provisional application No. 60/426,844, filed on Nov. 15, 2002.

(51) Int. Cl.
*H04N 7/18* (2006.01)
(52) U.S. Cl. ............... 375/240.12; 375/240.13; 375/240.15; 375/240.25; 375/240.26

(58) Field of Classification Search .....................
375/240.11–240.29
See application file for complete search history.

(56) References Cited

U.S. PATENT DOCUMENTS

| 5,818,533 | A | * | 10/1998 | Auld et al. ............ 375/240.14 |
| 6,141,489 | A | * | 10/2000 | Honda ........................ 386/95 |
| 6,611,561 | B1 | * | 8/2003 | Hannuksela et al. ... 375/240.27 |
| 2002/0061183 | A1 | * | 5/2002 | MacInnis ..................... 386/68 |
| 2002/0146239 | A1 | * | 10/2002 | Hamasaka et al. ............ 386/95 |
| 2003/0121038 | A1 | | 6/2003 | Aggarwal et al. |
| 2003/0121044 | A1 | | 6/2003 | Aggarwal et al. |
| 2003/0169815 | A1 | | 9/2003 | Aggarwal et al. |
| 2004/0156434 | A1 | | 8/2004 | Aggarwal et al. |

* cited by examiner

*Primary Examiner*—Anand Rao
(74) *Attorney, Agent, or Firm*—McAndrews, Held & Malloy, Ltd.

(57) ABSTRACT

A system, method, and apparatus for reducing the video decoder processing requirements are presented herein. During a rewind operation, a reference picture for a group of pictures is decoded and stored into a reference frame buffer. By storing a reference picture for the group, the reference picture need not be decoded to display each picture in the group during the rewind operation.

2 Claims, 9 Drawing Sheets

COMMAND PACKET SYSTEM AND METHOD SUPPORTING IMPROVED TRICK MODE PERFORMANCE IN VIDEO DECODING SYSTEMS

RELATED APPLICATIONS

This application is a continuation-in-part of U.S. application Ser. No. 09/951,693, filed Sep. 12, 2001 and entitled "COMMAND PACKETS FOR PERSONAL VIDEO RECORDER" by Demas et. al., which is incorporated by reference herein.

This application also claims priority from Provisional Application, Serial No. 60/426,844, filed Nov. 15, 2002, by Kellerman, et. al., which is incorporated by reference herein.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to video recorder and playback systems, and more particularly to controlling the presentation of content.

Television.(TV) content distribution is quickly migrating from analog formats to compressed digital formats. Currently, distribution of digital video content for TV display is dominated by use of the MPEG-2 video compression standard (ISO/IEC 13818-2). MPEG-2 and its predecessor MPEG-1 define the standards to compress video content using a combination of various techniques. An MPEG-encoded stream may have three types of pictures, Intra-coded (I), Predicted (P) and Bi-directionally predicted (B). I-pictures are not compressed using any temporal predictions and can be decoded without the need of any other picture. The P-pictures perform temporal predictions from a picture that comes before it in the display order. Thus, decode of a P-pictures requires one picture (from the past) to be available with the decoder for performing temporal predictions. This prediction picture may be either an I-picture or another P-picture. The B-pictures are bi-directionally predicted and, hence, use two pictures for prediction, one from the past and another from the future (in display order).

During normal decode of MPEG streams, video decoders store the last two decompressed I/P pictures in memory. The last I/P picture is used for predicting an incoming P-picture and the last two I/P pictures are used for predicting an incoming B-picture. During a Rewind operation, the pictures have to be displayed in the reverse order. The video stream is itself fed to the decoder through a system that first recorded the stream on a recordable media such as a harddisk. A Rewind operation is complex because B-pictures cannot be decoded from the previously decoded pictures in the rewind order. Rather, the last two prediction pictures in the forward decode order are needed by the decoder in order to decode a B-picture.

The foregoing can be accomplished by decoding pictures in the forward picture order starting from the last I-picture before the B-picture in the forward decoding order. The I-picture is used as a reference picture since I-pictures do not require any other picture to be decoded. Further, the intervening pictures between the reference picture and the current picture only need to be decoded but not displayed.

However, a special class of MPEG-2 streams, known as Headend In The Sky (HITS) streams, do not include I-pictures, in order to increase the video compression and reduce the bandwidth required to transmit a video stream. Instead, HITS streams use a progressive refresh mechanism to build reference pictures. The progressive refresh mechanism of HITS mandates that each P-picture have at least one intra-coded slice(s), where a slice is 16 horizontal lines of pictures. Furthermore, the intra-coded slice(s) in a P-picture will be just below the intra-coded slice(s) of the previous P-picture. The top slice is intra-coded for a P-picture following a P-picture with an intra-coded slice at the bottom of the picture. The number of intra-coded slices in a P-picture is called the "refresh-rate" of the stream. The streams also ensure that the slices above the intra-coded slice(s) predict only from those slices of the previous P-picture. The streams also ensure that the slices above the intra-coded slice(s) predict only from those slices of the previous P-picture that are above the current intra-coded slices. Thus, the slices are progressively refreshed from top to bottom. This scheme ensures that if a series of pictures is decoded starting from a P-picture whose first-slice is intra-coded, then a "clean" refreshed picture is built after all slices have been progressively refreshed. The picture whose first-slice is intra-coded is called an Entry Point (EP) picture. Typical values of slice refresh rates are 1 and 3 for a stream with a vertical sized of 480 pixels (30 slices, each of 16-lines). Thus, a clean picture may be built by decoding 30 P-pictures when the refresh rate is 1, and 10 P-pictures when the refresh rate is 3.

To perform a Rewind operation on a HITS stream, a video decoder first builds a clean reference using the progressive refresh mechanism, and decodes the intervening pictures between the clean reference and the current picture in the rewind sequence.

Thus, an existing decoder has to decode multiple pictures for displaying a single picture. If such a decoder is unable to decode multiple pictures in the given time limit for getting ready with a new picture for display, then the video quality suffers.

Further limitations and disadvantages of conventional and traditional systems will become apparent to one of skill in the art through comparison of such systems with the invention as set forth in the remainder of the present application with reference to the drawings.

BRIEF SUMMARY OF THE INVENTION

A system, method, and apparatus for performing personal video recording (PVR) functions on digital video systems are described herein. A reference picture is selected for a given segment of pictures, from which each of the pictures in the segment are data-dependent. The pictures in the segment are displayed in reverse order by decoding each picture in the forward decode order between the reference picture and the picture to be displayed for each picture in the segment.

In one embodiment, the reference picture is an I-picture for a group of pictures (GOP). The I-picture is stored in a reference picture frame buffer. The pictures in the GOP are displayed in reverse order by decoding each of the I/P-pictures in the forward decode order between the I-picture and the picture to be displayed.

In another embodiment, the reference picture is a clean reference picture in a HITS stream. The pictures in an EP—EP segment are decoded by decoding and storing the clean reference picture immediately preceding the EP to EP segment in the forward order. The pictures in the EP to EP segment are decoded in reverse order by decoding each P-picture in the forward decode order between the clean reference picture and the picture to be displayed.

In another embodiment, the reference picture includes P-pictures located at some point within an EP to EP segment, a midpoint picture, such as pictures towards the middle of the EP to EP segment. The pictures in the EP to EP segment that come after the midpoint picture are decoded using the midpoint picture as the reference picture. The pictures in the EP to EP segment that are before the midpoint picture are decoded using a clean reference picture.

These and other advantages and novel features of the present invention, as well as illustrated embodiments thereof will be more fully understood from the following description and drawings.

BRIEF DESCRIPTION OF SEVERAL VIEWS OF THE DRAWINGS

A better understanding of the invention can be obtained when the following detailed description of various exemplary embodiments is considered in conjunction with the following drawings.

DETAILED DESCRIPTION OF THE INVENTION

Figure 1:
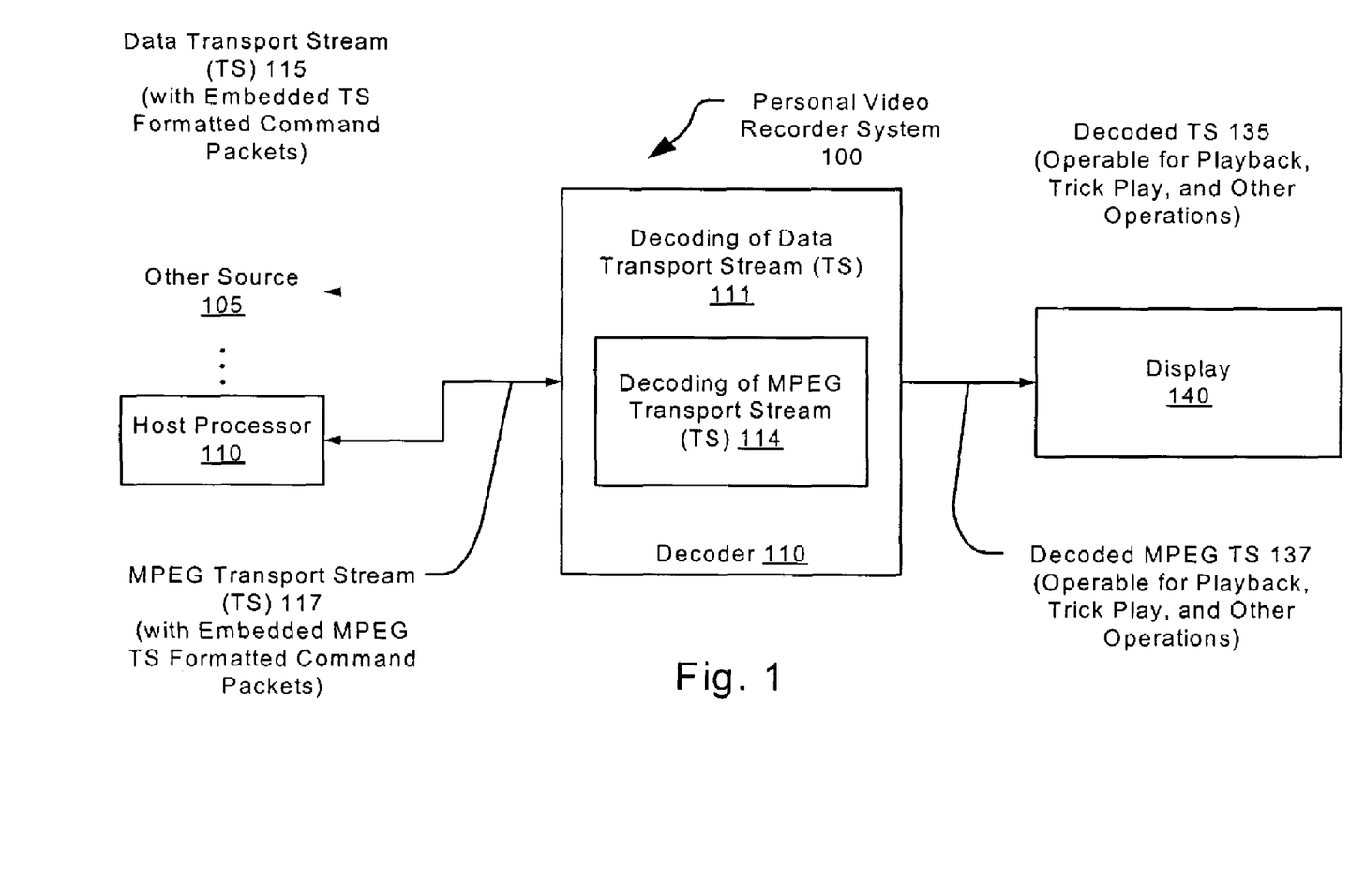
FIG. 1 is a system diagram illustrating an embodiment of a personal video recorder system in accordance with certain aspects of the present invention.

FIG. 1 is a system diagram illustrating an embodiment of a personal video recorder system 100 that is built in accordance with certain aspects of the present invention. The personal video recorder system 100 includes a decoder 120 that receives a data transport stream (TS) 115 from some source. The TS 115 may be received by the decoder 120 from a host processor 110, . . . , or any other source 105 without departing from the scope and spirit of the invention. The host processor 110 or the any other source 105 is the device that controls the playback (including trick play playback) of the data. The host processor 110 or the any other source 105 and the decoder 120 may be included within a single device or separate devices.

The decoder 120 is operable to perform decoding of the TS 115, as shown in a functional block 122 within the decoder 120. Similarly, the decoder 120 is operable to perform decoding of the MPEG TS 117, as shown in a functional block 124 within the decoder 120. The now decoded TS 135, is passed to an output device shown as a display 140. Again, other output devices may be employed to accommodate various data types, including audio data types. The use of a display 140 is used to show the exemplary situation of video data TSs. The display 140 is operable to perform playback of the now decoded TS 135. The decoded TS 135 may be of various data types, including audio and video data types.

The decoded TS 135 is now operable for playback, trick play, and other operations within the output device. In one particular situation, the decoded TS may be a decoded MPEG TS 137 that is operable for playback, trick play, and other operations.

Figure 2:
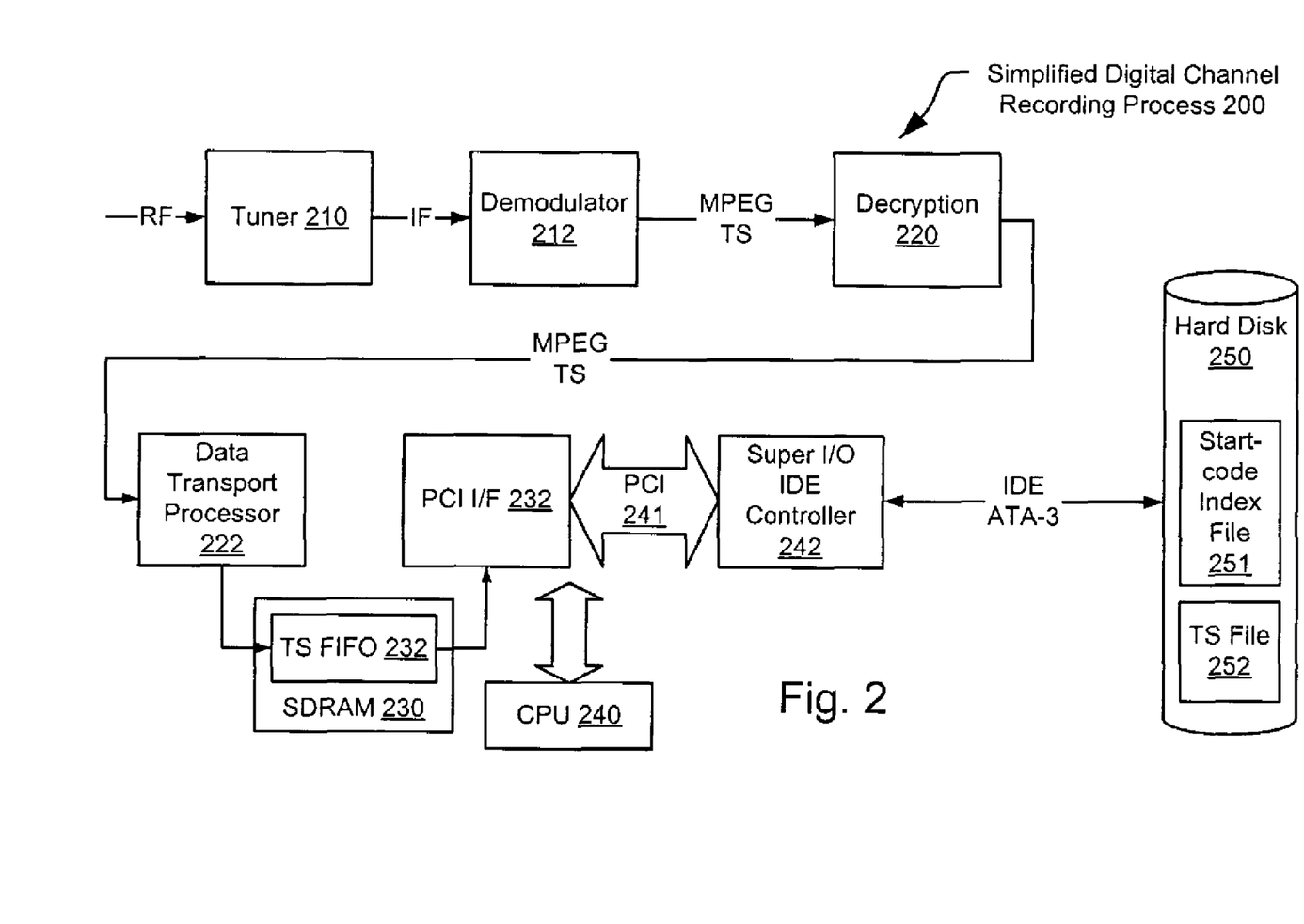
FIG. 2 is a system diagram illustrating an embodiment of a recording process.

FIG. 2 is a system diagram illustrating an embodiment of a simplified digital channel recording process 200 that is performed in accordance with certain aspects of the present invention. The FIG. 2 shows one embodiment where digital channel recording may be performed, in a simplified manner when compared to previous systems, using certain aspects of the present invention. The recording process of a digital video stream is given in the FIG. 1. In this embodiment, a personal video recorder (PVR) digital-channel-recording process can be employed as set forth below.

The selected video service is contained in a transport stream (TS) that is received as shown in a radio frequency (RF) signal, which is received by a tuner 210. The tuner 210 is operable to down-convert the channel that contains the transport stream, from RF to intermediate frequency (IF). The Demodulation block, shown as a demodulator 215, demodulates the IF to base-band digital data and outputs the transport stream (shown as an MPEG TS) and sends the data to the decryption block 220.

The decryption block 220 decrypts the packets of the TS into clear data if the service is authorized. This output TS stream goes to the Data Transport Processor 225. The Data Transport Processor selects the requested service and then re-multiplexes it into a new TS and stores the new TS data in a TS FIFO buffer 232 in synchronous dynamic random access memory (SDRAM) 230.

This new TS is then transferred to a hard disk 250. The data within the TS FIFO buffer 232 is operable to be communicated to the hard disk 250. The CPU 240 controls the storing of the data from the TS FIFO 232 to the hard drive (hard disk 250). This is done using DMA engines which send the data over the PCI bus 241 to the super I/O controller chip 245 containing the IDE interface to the hard drive (hard disk 250) itself. If desired, the IDE ATA-3 Advanced Technology Attachment Interface with Extensions—AT Attachment 3 Interface protocol is employed between the super I/O controller chip 245 and the hard disk 250. A Start Code Index Table (SCIT) 251 is also generated and stored in the hard disk 250 (see below for detailed description). A TS file 252 is then stored within the hard disk 252.

The embodiment of the present invention shown in the FIG. 2 shows how a TS may be generated and stored in a hard disk 250.

Figure 3:
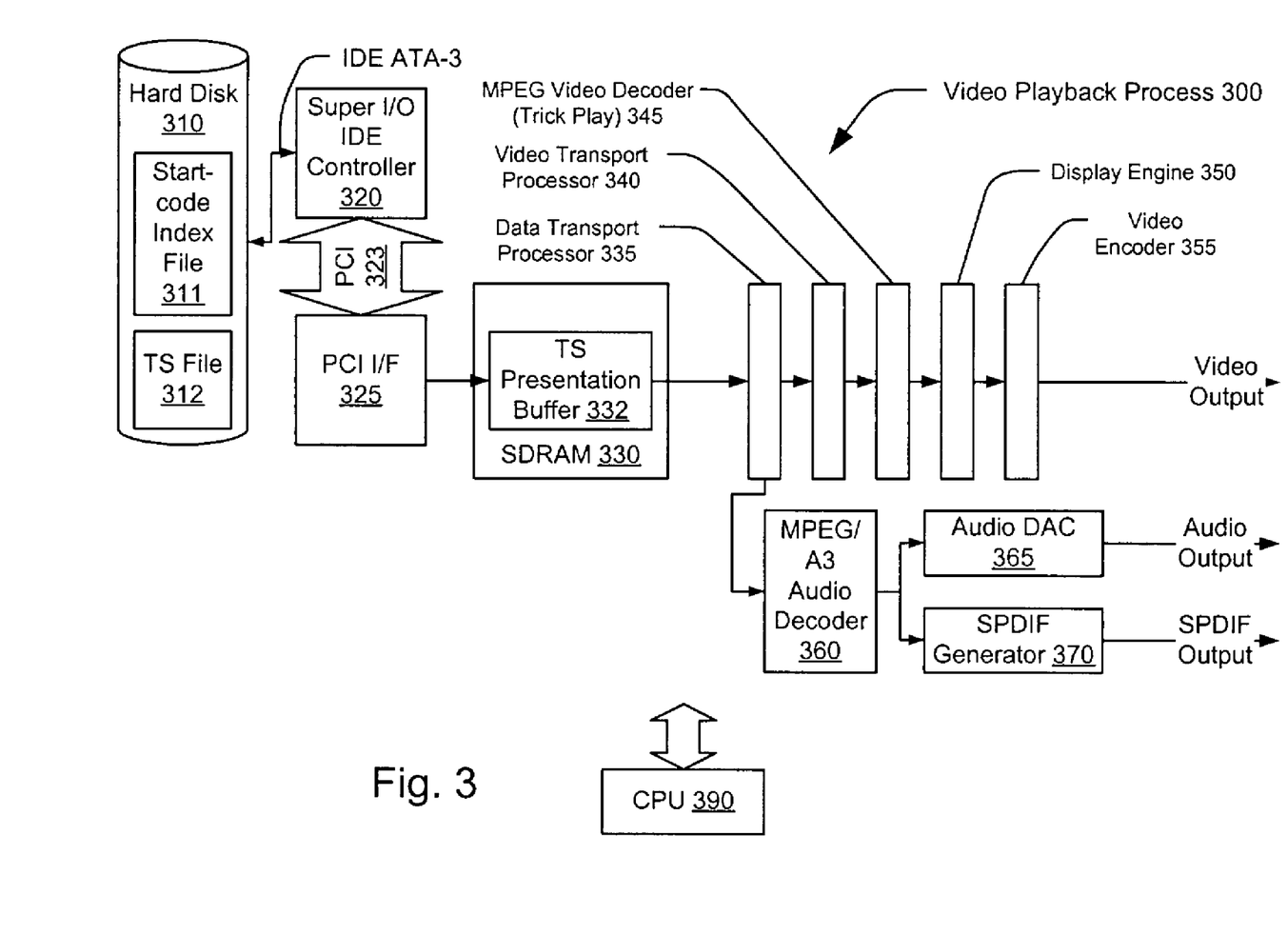
FIG. 3 is a system diagram illustrating an embodiment of a video playback process.

FIG. 3 is a system diagram illustrating an embodiment of a video playback process 300 that is performed in accordance with certain aspects of the present invention. The particular example of video data retrieval and playback is shown in the FIG. 3, but these aspects of the present invention are also extendible to retrieval and playback of other types of data, including audio data and other digital data types.

For a program recorded on the hard drive/hard disk 310, a personal video recorder, or other operable system, can play back that program using that which is described below in the system diagram of the FIG. 3. A processor, that may include a CPU 390, reads the TS data (shown as the TS file 312) from the hard drive/hard disk 310 based on the user selected playback mode. The correct TS data (from the TS file 312 within the hard drive/hard disk 310) is read into TS presentation buffer 332 within a SDRAM 330 using DMA engines.

Data may be read from the hard drive/hard disk 310 in a manner similar to the manner in which data is written into the hard drive/hard disk 310, a super I/O controller chip 320 may communicatively couple with the hard disk 310 and perform data transfer using the IDE ATA-3 protocol. The super I/O controller chip 320 then communicatively couples to the TS presentation buffer 332 within the SDRAM 330 via a PCI bus 323 and a PCI I/F 325. The data is output from the TS presentation buffer 332 and is then passed to a data transport processor 335. The data transport processor then de-multiplexes the TS into its PES constituents and passes the audio TS to an audio decoder 360 and the video TS to a video transport processor 340 and then to a MPEG video decoder 345 that is operable to decode and extract embedded, TS formatted command packets, which may include instructions to perform trick play functionality. The audio data is then sent to the output blocks, and the video is sent to a display engine 350. The display engine 350 is responsible for and operable to perform scaling the video picture, rendering the graphics, and constructing the complete display, among other functions. Once the display is ready to be presented, it is passed to a video encoder 355 where it is converted to analog video using an internal digital to analog converter (DAC). The digital audio is converted to analog in the audio digital to analog converter (DAC) 365 while a Sony Philips Digital Inter-Face (SPDIF) output stream is also generated and transmitted.

The video TS comprises pictures that are compressed representations of individual images forming a video. The video decoder 345 decompresses the pictures, thereby recovering the individual images forming the video. Compression is achieved by taking advantage of both spatial and temporal redundancy in the image forming the video. Compression using temporal redundancy takes advantage of redundancies between video images recorded in substantially the same time period. Redundant features among the images are recorded in one picture referenced by other pictures. As a result, some pictures are data dependent on other pictures.

Figure 4:
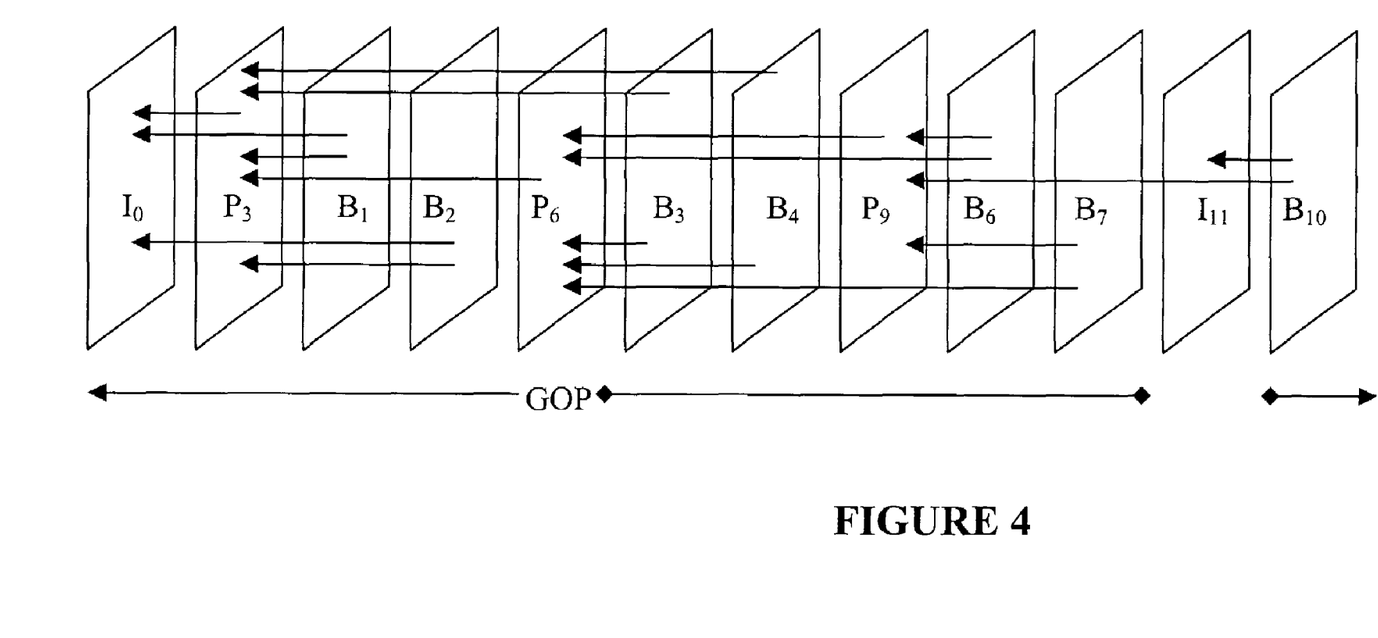
FIG. 4 is a block diagram of a series of pictures in forward decode order.

Referring now to FIG. 4, there is illustrated a block diagram of an exemplary series of pictures in the forward decode order. The temporal order is indicated by the subscript. The data dependence of each picture is illustrated by the arrows. For example, picture $B_2$ is dependent on pictures $I_0$ and $P_3$. Pictures coded using temporal redundancy with respect to only earlier pictures in the display order are known as predicted pictures (or P-pictures), for example picture $P_3$. Pictures coded using temporal redundancy with respect to earlier and later pictures of the video sequence are known as bi-directional pictures (or B-pictures), for example, pictures $B_1$, and $B_2$. Pictures that are not coded using temporal redundancy are known as I-pictures, for example $I_0$.

The foregoing data dependency among the pictures generally requires decoding of certain pictures prior to others. Additionally, the use of later pictures in the display order to decode previous pictures, generally requires that the later pictures in display order be decoded prior to the previous picture. As a result, the pictures cannot be decoded in temporal order. Accordingly, the pictures are decoded in the order of data dependence. For example, picture $B_2$ is dependent on $P_3$. Therefore, picture $P_3$ is received prior to $B_2$ The foregoing is referred to as decode order.

During normal playback, video decoders store the last two decoded I/P pictures in memory. The last I/P picture is used for predicting a P-picture and the last two pictures are used for predicting B-pictures. The foregoing memory is referred to as a frame buffer. Conventional video decoders typically have three buffers. The first and second frame buffers are used to store the last two decompressed I/P pictures and the third frame buffer used to build the present picture.

The trick play operations include a rewind operation. During a rewind operation, the pictures have to be displayed in the reverse order. The foregoing can be accomplished by receiving and decoding the I picture, e.g., $I_0$ and each P-picture, e.g., $P_3$, $P_6$, $P_9$, preceding, in the forward decode order, the picture for display, for each picture in the rewind sequence. The table below illustrates the sequence of decoders for rewinding the pictures in FIG. 4, starting from $B_8$.

| Display Picture | Decoded Pictures |
| --- | --- |
| $B_8$ | $I_0$, $P_3$, $P_6$, $P_9$ |
| $B_7$ | $I_0$, $P_3$, $P_6$, $P_9$ |
| $P_6$ | $I_0$, $P_3$ |
| $B_5$ | $I_0$, $P_3$, $P_6$ |
| $B_4$ | $I_0$, $P_3$, $P_6$ |
| $P_3$ | $I_0$ |
| $B_2$ | $I_0$, $P_3$ |
| $B_1$ | $I_0$, $P_3$ |
| $I_0$ | $I_0$ |

As can be seen from the table, the picture $I_0$ is decoded for each picture in the GOP. To avoid repeated decoding of $I_0$, $I_0$ can be stored as a reference picture in an additional frame buffer at the video decoder 345, referred to as the reference picture frame buffer. The pictures are displayed in reverse order by grouping the pictures into groups of pictures (GOPs). Each GOP includes a reference picture, e.g., the I-picture, and each picture that is data dependent on the reference picture. Prior to displaying the pictures of the GOP in the reverse order, the reference picture is stored in a reference picture frame buffer. Each picture of the GOP is displayed by decoding the pictures between the reference picture and the picture for display. By storing the reference picture in the frame buffer, the reference picture only has to be decoded one time for all of the pictures in the GOP.

Figure 5:
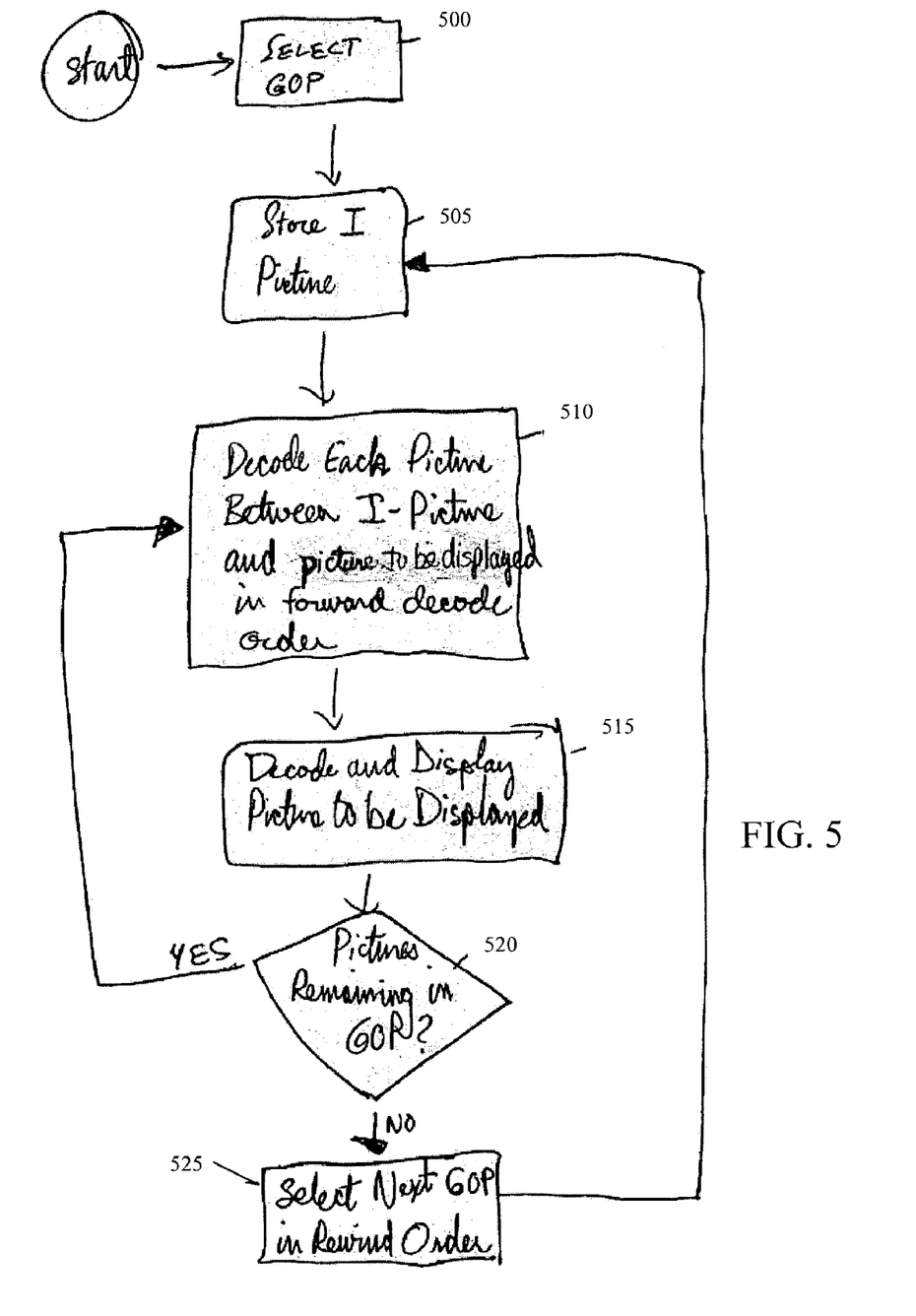
FIG. 5 is a flow diagram for displaying pictures during a rewind operation in accordance with one embodiment of the present invention.

Referring now to FIG. 5, there is illustrated a flow diagram for displaying pictures during a rewind operation. At 500 the GOP group in the current rewind order is selected. At 505, the I picture is stored. At 510, each picture in the forward decode order between the I picture and the picture to be displayed, are decoded. At 515, the current picture in the rewind order decoded and displayed. If at 520, there are remaining pictures in the GOP that have not been displayed, 510–515 are repeated until each picture in the GOP is displayed. At 525, the next GOP in the rewind order is displayed by repeating 505–520.

Figure 6:
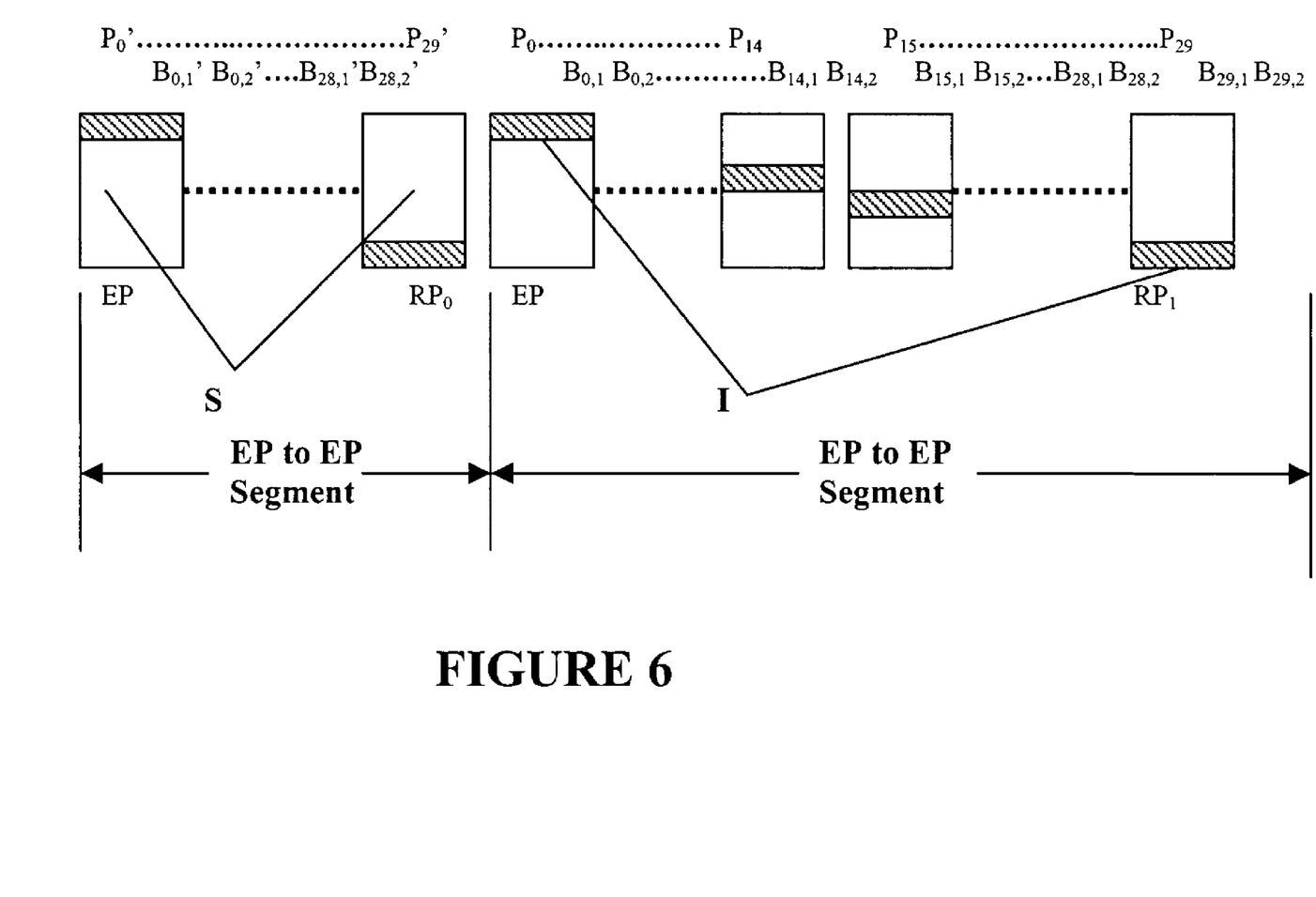
FIG. 6 is a block diagram describing an exemplary HITS stream.

Referring now to FIG. 6, there is illustrated a block diagram describing an exemplary HITS stream. A HITS stream is a special class of MPEG-2 streams that includes P-pictures, P, and B-pictures, B, but does not include I-pictures. There are usually a uniform number of B-pictures, for example Bo, and $B_{02}$, between each of the P-pictures. HITS streams do not include I-pictures because I-pictures require the most memory and bandwidth. Instead, HITS streams use a progressive refresh mechanism to build reference pictures. In the progressive refresh mechanism, each P-picture, P, has at least one intra-coded slice(s), I, where a slice comprises 16 horizontal lines of pixels. Furthermore, the intra-coded slice(s) in a P-picture, e.g., $P_{15}$ will be just below the intra-coded slice(s) of the previous P-picture, e.g., $P_{14}$. The top slice, I, is intracoded for a P-picture, $P_0$, following a P-picture, P, with an intracoded slice, I, at the bottom of the picture, $RP_1$. Additionally, the streams also ensure that the slices above the intra-coded slices, S, predict only from those slices of the previous P-picture that are above the current intracoded slice(s), I. The foregoing ensures that if a series of pictures is decoded starting from a P-picture whose first-slice is intra-coded, then a "clean" refreshed picture is built after all slices have been progressively refreshed. The P-picture whose first-slice is intra-coded is called an Entry Point (EP) picture, EP. The P-picture immediately before the EP picture, EP, i.e., the P-picture with the I-slice(s), I, at the bottom of the picture, RP, will be referred to as a clean reference picture.

The rewind operation on a HITS stream, starting from arbitrarily chosen picture, $B_{29,2}$, can be achieved by building the clean reference picture, $RP_1$, immediately preceding the arbitrarily chosen picture $B_{29,2}$, and decoding each intervening P-picture in the forward decode order before the chosen picture, $B_{29,2}$. Building the clean reference picture $RP_1$ involves decoding each P-pictures in the EP to EP segment comprising $RP_0$, e.g., $P_0'$ . . . $P_{28}'$. While decoding the intervening P-pictures, the last two P-pictures are stored in memory. Upon decoding the last two P-pictures, $P_{28}$, $P_{29}$ before the chosen picture, $B_{28,2}$, the decoder can then decode the chosen picture. The foregoing is repeated for each picture in the rewind sequence. The decoded pictures for various pictures in the rewind sequence for the HITS stream illustrated in FIG. 5 are shown in the table below.

| Picture Displayed | Pictures Decoded |
|---|---|
| $B_{29,2}$ | $P_0'$ . . . $P_{29}'$, $P_0$ . . . $P_{29}$ |
| $B_{29,1}$ | $P_0'$ . . . $P_{29}'$, $P_0$ . . . $P_{29}$ |
| $P_{29}$ | $P_0'$ . . . $P_{29}'$, $P_0$ . . . $P_{28}$ |
| $B_{28,2}$ | $P_0'$ . . . $P_{29}'$, $P_0$ . . . $P_{28}$ |
| $B_{28,1}$ | $P_0'$ . . . $P_{29}'$, $P_0$ . . . $P_{28}$ |
| $P_{28}$ | $P_0'$ . . . $P_{29}'$, $P_0$ . . . $P_{27}$ |
| $B_{27,2}$ | $P_0'$ . . . $P_{29}'$, $P_0$ . . . $P_{27}$ |
| $B_{27,1}$ | $P_0'$ . . . $P_{29}'$, $P_0$ . . . $P_{27}$ |
| . | |
| . | |
| . | |
| $B_{02}$ | $P_0'$ . . . $P_{29}'$, $P_0$ |
| $B_{01}$ | $P_0'$ . . . $P_{29}'$, $P_0$ |
| $P_0$ | $P_0'$ . . . $P_{29}'$ |

As can be seen, decoding pictures in the rewind sequence involves decoding large numbers of pictures. For example, for a HITS stream with a refresh rate of 1, there would be 30 P-pictures between the EP's. For pictures at the end of an EP to EP segment, an additional 30 P-pictures would have to be decoded. Therefore, the number of pictures that would have to be decoded is:

$$(Y+1)\sum_{x=0}^{29}(30+(x+1))$$

where Y=# of B-pictures between P-pictures

From the above formula, 1365 pictures are decoded to display 30 pictures in reverse order, or an average of 45.5 decoded pictures/displayed picture.

In order to reduce the processing requirements of the video decoder 345, in accordance with the present invention, the clean reference pictures, e.g., $RP_0$, $RP_1$, are stored in a reference picture frame buffer. By storing the clean reference picture in the reference picture frame buffer, the video decoder 345 need only build the reference picture one time for an entire EP—EP segment. Each picture of the EP—EP segment can then be decoded by decoding only the intervening pictures between the clean picture and the picture in the rewind sequence. For example, by storing $RP_0$ in a reference picture frame buffer, $RP_0$ need only be decoded once for all the pictures, $P_0$ . . . $P_{29}$.

Figure 7:
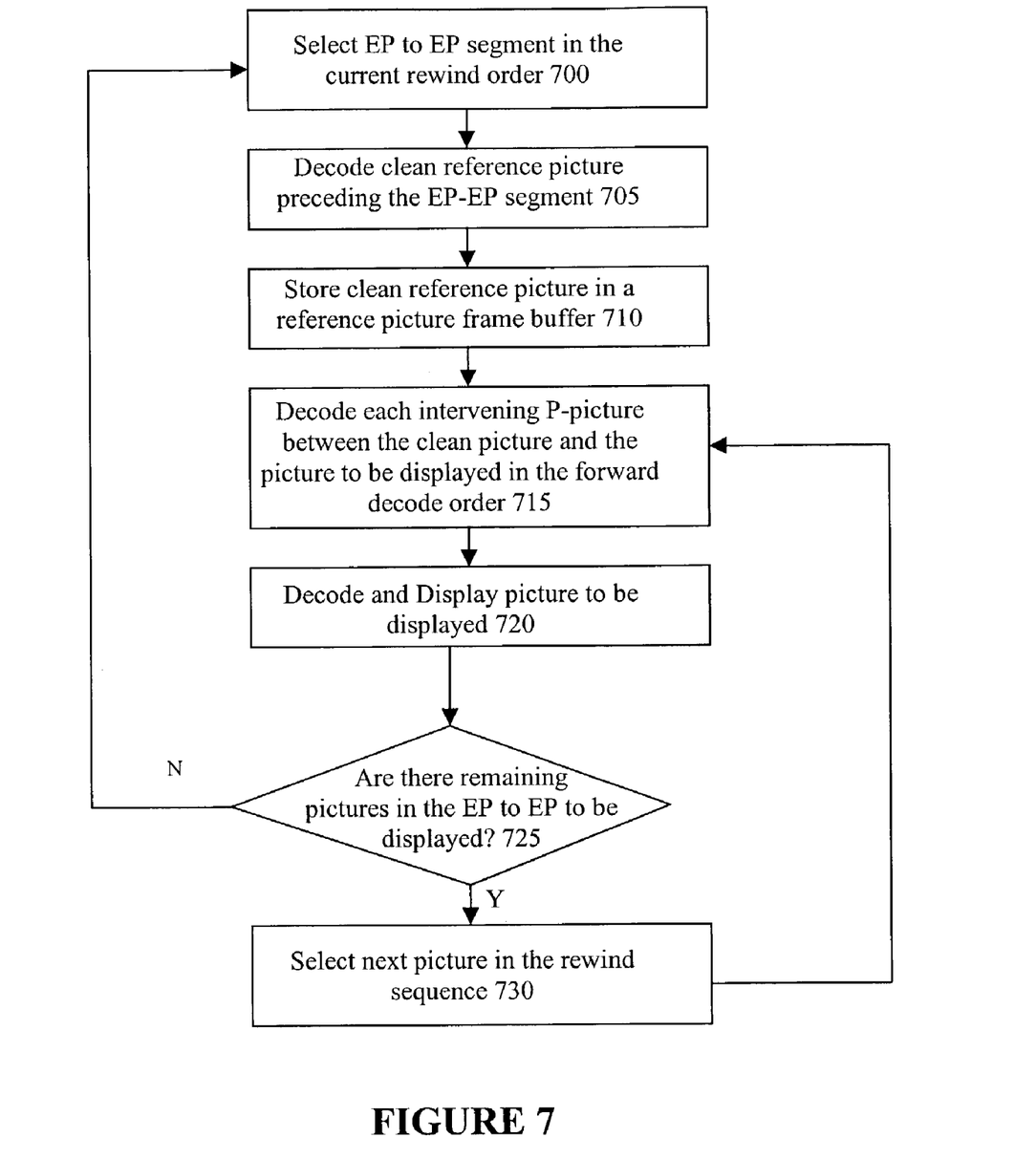
FIG. 7 is a flow diagram for displaying pictures of a HITS stream during a rewind operation, in accordance with an embodiment of the present invention.

Referring now to FIG. 7, there is illustrated a flow diagram for displaying pictures in a HITS stream during a rewind operation in accordance with an embodiment of the present invention. At 700 the EP—EP segment in the current rewind order is selected. At 705, the clean reference picture preceding the EP—EP segment is decoded. At 710, the clean reference picture is stored in a reference picture frame buffer. At 715, each intervening P-picture between the clean picture and the picture to be displayed is decoded in the forward decode order. During decoding of the P-pictures the last two P-pictures in the forward decode order are stored in frame buffers. Upon decoding and storing the last two P-picture in the forward decode order that precede the picture to be displayed, the picture to be displayed can be decoded. Accordingly, at 720, the picture to be displayed is decoded and displayed. At 725, if there are remaining pictures in the EP to EP segment to be displayed, the next picture in the rewind sequence is selected, and 715–720 are repeated. If at 725, there are no remaining pictures in the EP to EP segment, the next EP to EP segment is selected at 700, and 705–725 are repeated.

By storing the clean reference picture in a frame buffer, the clean reference picture need only be decoded one time per EP to EP segment. Accordingly, the number of pictures required to decode an EP to EP segment, with a refresh rate of 1, is:

$$30 + (Y+1)\sum_{x=0}^{29}(x+1)$$

where Y=# of B-pictures between P-pictures

As can be seen from the foregoing, an EP to EP segment with no B-pictures between the P-pictures requires decoding of 495 pictures, or 16.5 decoded pictures/displayed picture. As the number of B pictures are increased, the decode to display ratio approaches 15.

In the above strategy, after building a clean reference picture, the complete EP to EP segment following the clean picture is displayed. An alternative scheme is to build an additional reference picture within an EP—EP segment to minimize the number of pictures that need to be decoded. This additional reference picture is at a midpoint of the P-pictures in an EP—EP segment, such as pictures $P_1$ . . . $P_{28}$. Thus, the pictures after this chosen midpoint can be decoded from this additional reference picture and those before the midpoint picture are decoded from the clean picture. For example, in the HITS stream described in FIG. 5, the midpoint picture $P_{14}$ can be used as a reference picture for the pictures in the EP to EP segment which are after $P_{14}$, and the clean reference picture is used as a reference picture for the pictures coming before $P_{14}$.

Figure 8:
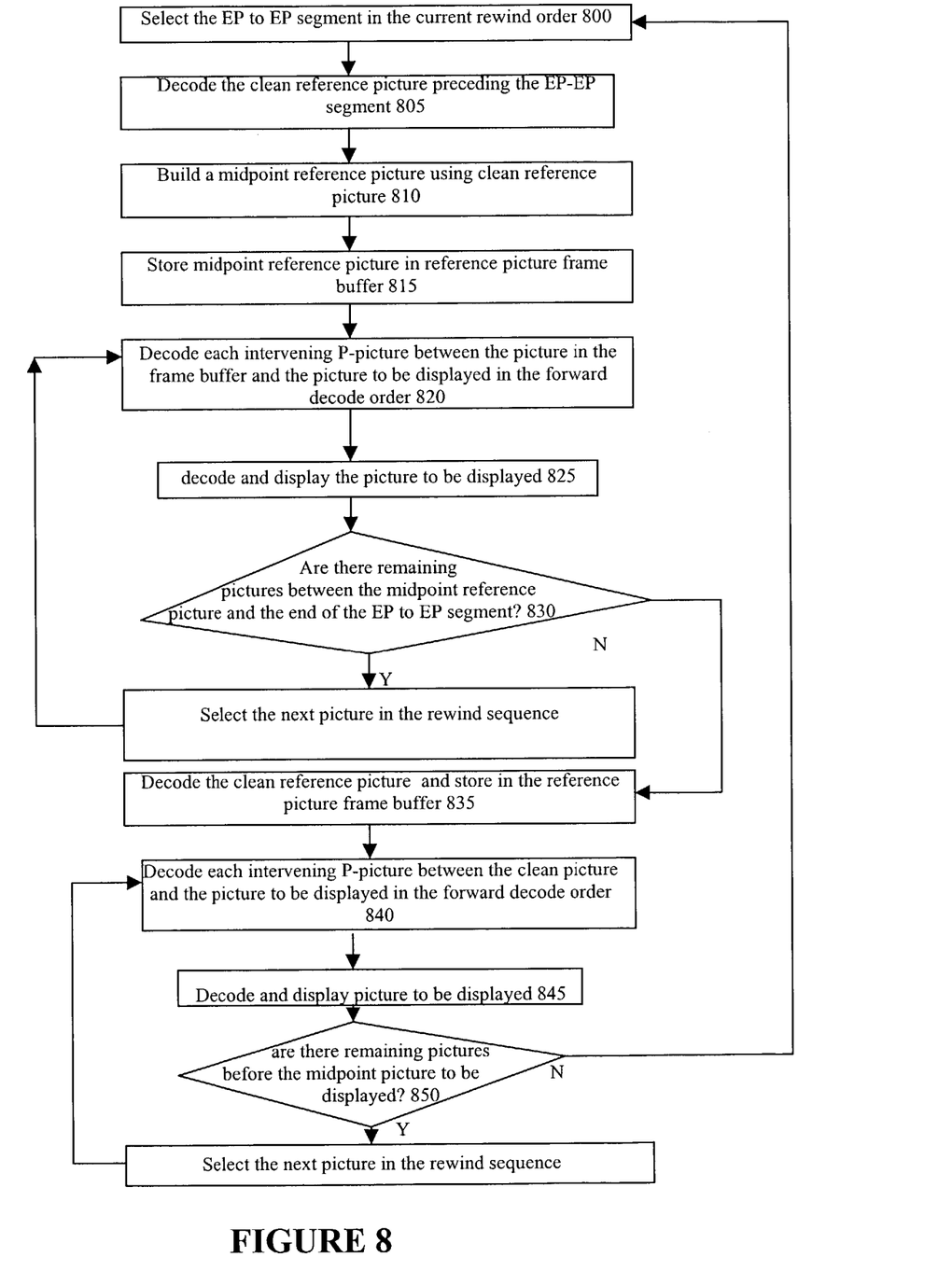
FIG. 8 is a flow diagram for displaying pictures of a HITS stream during a rewind operation in accordance with another embodiment of the present invention.

Referring now to FIG. 8, there is illustrated a flow diagram for displaying pictures in a HITS stream during a rewind operation in accordance with another embodiment of the present invention. The flow diagram will be described with reference to the HITS stream illustrated in FIG. 4. At 800 the EP—EP segment in the current rewind order is selected. At 805, the clean reference picture preceding the EP—EP segment, e.g., $RP_0$, is decoded. At 810, the clean reference picture is used to decode the midpoint reference picture, e.g., $P_{14}$. At 815, the midpoint reference picture is stored in the reference picture frame buffer. At 820, each intervening P-picture between the picture in the frame buffer and the picture to be displayed is decoded in the forward decode order. During decoding of the P-pictures, the last two P-pictures in the forward decode order are stored in frame buffers. Upon decoding and storing the last two P-pictures in the forward decode order that precede the picture to be displayed, the picture to be displayed can be decoded. Accordingly, at 825, the picture to be displayed is decoded and displayed. At 830, if there are remaining pictures between the midpoint reference picture and the end of the EP—EP segment to be displayed, the next picture in the rewind sequence is selected, and 820–830 are repeated.

If at 830, there are no remaining pictures between the midpoint reference picture and the end of the EP—EP segment to be displayed, the clean reference picture is decoded (835) and stored in the reference picture frame buffer. At 840, each intervening P-picture between the clean picture and the picture to be displayed is decoded in the forward decode order. During decoding of the P-pictures the last two P-pictures in the forward decode order are stored in frame buffers. Upon decoding and storing the last two P-picture in the forward decode order that precede the picture to be displayed, the picture to be displayed can be decoded. Accordingly, at 845, the picture to be displayed is decoded and displayed. At 850, if there are remaining pictures before the midpoint picture to be displayed, the next picture in the rewind sequence is selected, and 840–845 are repeated. If at 850, there are no remaining pictures, the next EP—EP segment is selected at 800, and 805–850 are repeated.

The foregoing further reduces the number of pictures to be decoded during rewind. For a HITS stream with a refresh rate of 1, there are 30 P-pictures in each EP—EP segment. There are 15 P-pictures between the beginning of the EP—EP segment and the mid-point reference picture, and 15 P-pictures between the mid-point reference picture and the end of the EP—EP segment. Accordingly, the number of pictures to be decoded is:

$$45 + 30 + 2*(Y+1)\sum_{x=0}^{14}(x+1)$$

where Y=number of B pictures between the P-pictures

For Y=0, 315 pictures are decoded for displaying 30 pictures, or 10.5 pictures decoded/pictures displayed. As Y is increased, the ratio of pictures decoded to pictures displayed approaches 8.

Although the embodiment is described in the context of HITS streams, it should be noted that the invention is not limited to HITS streams. For example, in another embodiment, the first I-picture of a GOP group can be selected as the first reference pictures and another picture in the GOP group can be selected as the second reference pictures, wherein the pictures between the I-picture and the second reference picture are decoded from the I-picture, and wherein the pictures after the second reference picture are decoded from the second reference picture.

Figure 9:
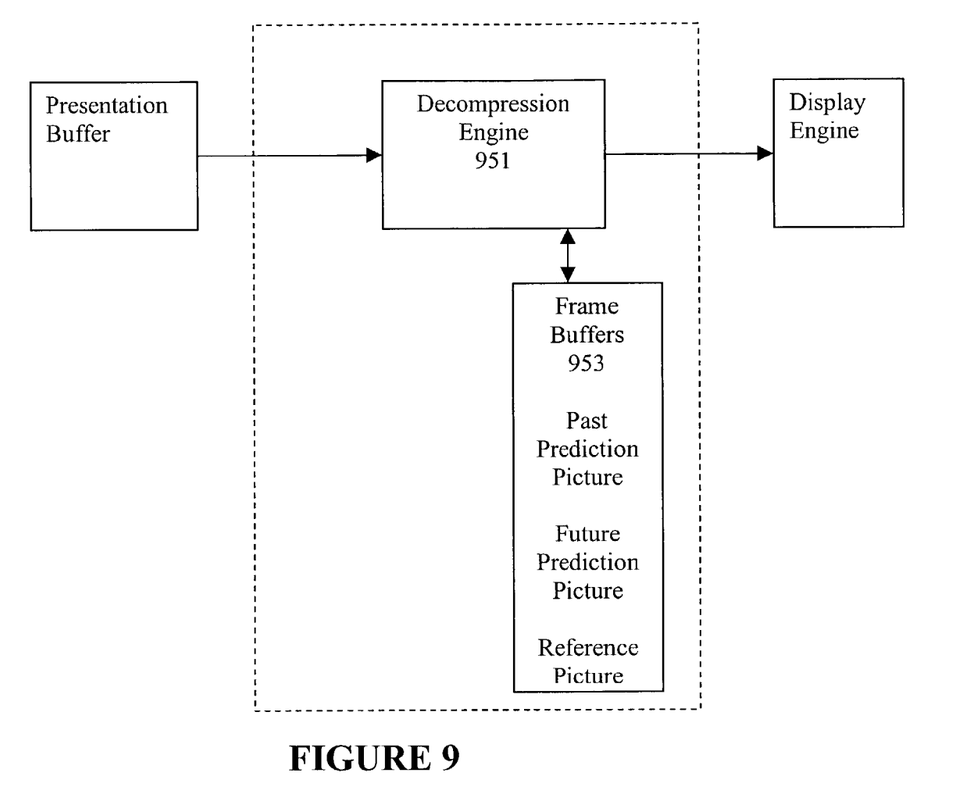
FIG. 9 is a block diagram of an exemplary video decoder in accordance with an embodiment of the present invention.

Referring now to FIG. 9, there is illustrated a block diagram of an exemplary video decoder 345 in accordance with an embodiment of the invention. The video decoder receives pictures form a presentation buffer and decodes the pictures for display. The decoded pictures for display are provided to the display engine. The video decoder 345 includes a decompression engine 951, a cache memory 952, and frame buffers 953. The decompression engine 951 performs the requisite decompression of received pictures, transforming the pictures into frames for display. As noted above, the pictures are data dependent from other pictures. Accordingly, the decompression engine 951 stores past prediction pictures, future prediction pictures, and reference pictures in the frame buffers 953. Additionally, the decompression engine 951 can store reference pictures in the frame buffers as well. While decoding pictures for display that are data dependent on the pictures stored in the frame buffers, the decompression engine 951 uses the pictures stored therein to decode and provide the picture for display to the display engine 350. Additionally, the video decoder also includes a cache 952 for storing pictures therein, to facilitate decoding pictures for display.

The personal video recorder system 200 as described herein may be implemented as a board level product, as a single chip, application specific integrated circuit (ASIC), or with varying levels of the system integrated on a single chip with other portions of the system as separate components. The degree of integration of the monitoring system may primarily be determined by speed of incoming MPEG packets, and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device wherein the memory storing instructions is implemented as firmware.

In one embodiment can be implemented by insertion of command packets within the MPEG TS with appropriate TS formatted trick play commands by a host processor, such as host processor described in "Command Packets for Personal Video Recorders", application Ser. No. 09/951,693, by Demas et. al, which is incorporated herein by reference.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A method for decoding pictures, said method comprising:
   storing a reference picture, said reference picture comprising a midpoint picture in an EP to EP segment;
   decoding a first prediction picture from the reference picture;
   decoding a second prediction picture from the reference picture;

decoding a display picture from the first prediction picture and the second prediction picture; and providing the display picture to a display device.

2. A decoder system for decoding pictures, said method comprising:

a first frame buffer for storing a reference picture, wherein the reference picture comprises a mid-point picture in an EP to EP stream during one time period, and a clean reference picture during another time period;

a second frame buffer for storing a first prediction picture;

a third frame buffer for storing a second prediction picture; and a circuit for decoding the first prediction picture and the second prediction picture from the reference picture and a display picture from the first prediction picture and the second prediction picture.

* * * * *